Figure 17:
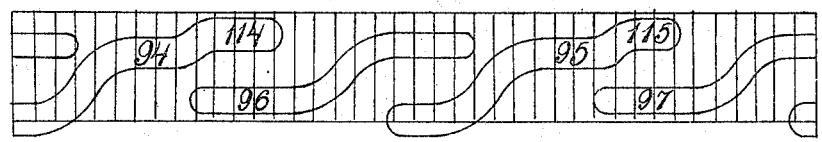

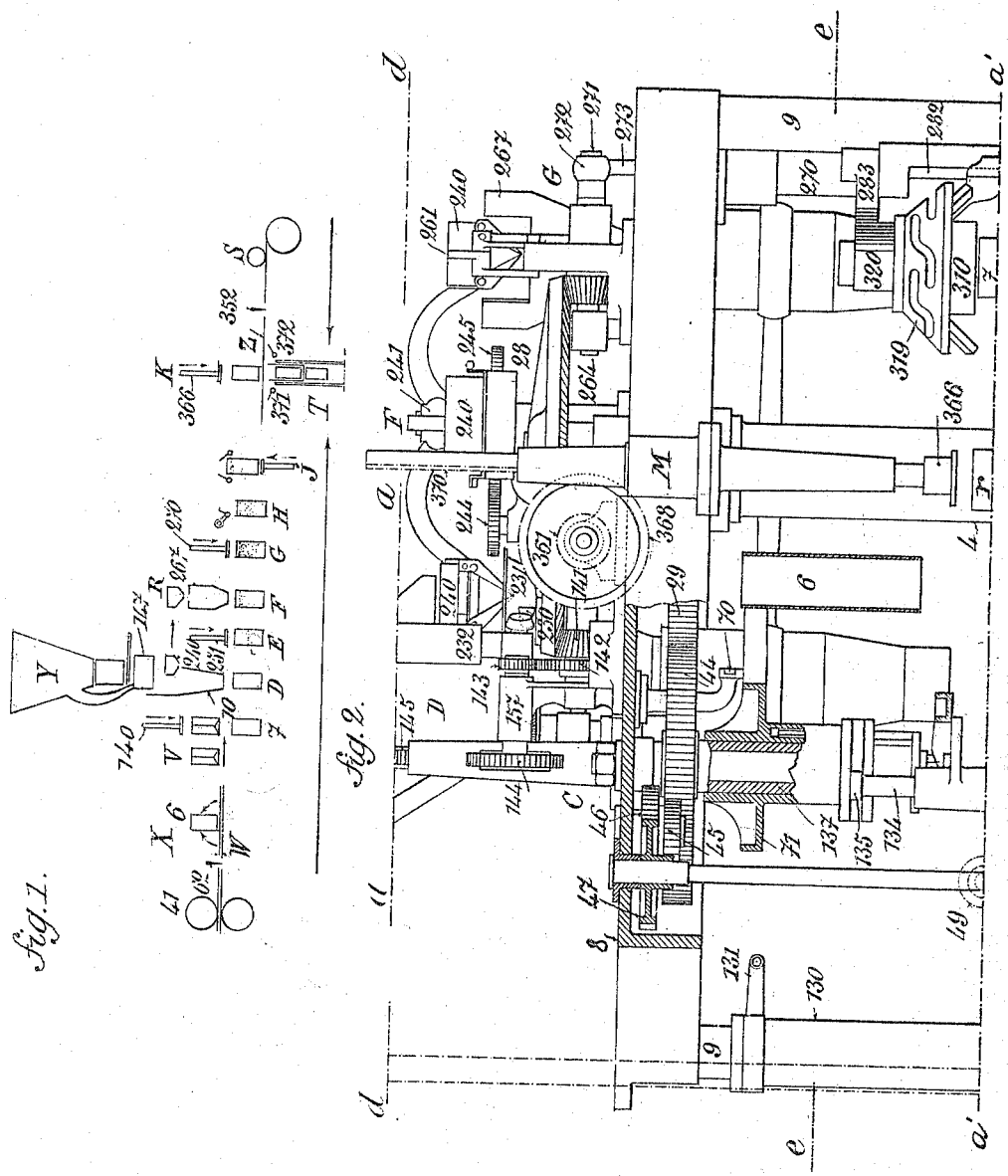

J. BARDET.
PARCELING MACHINE.
APPLICATION FILED JAN. 29, 1906.
957,833.
Patented May 10, 1910.
19 SHEETS—SHEET 2.
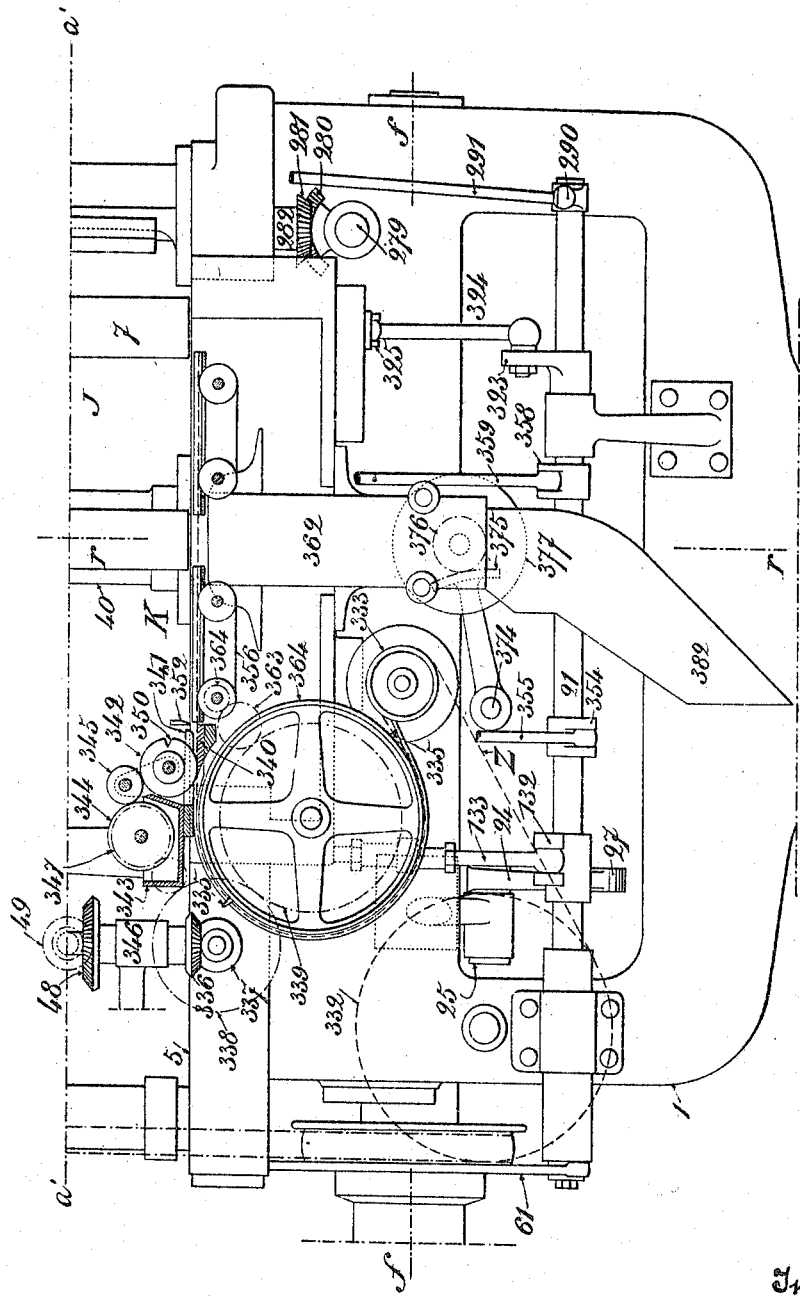
Witnesses.
O. P. Hardy
O. B. Hopkins
Inventor.
J. Bardet.
by H. A. Willson & Co.
Attorneys.

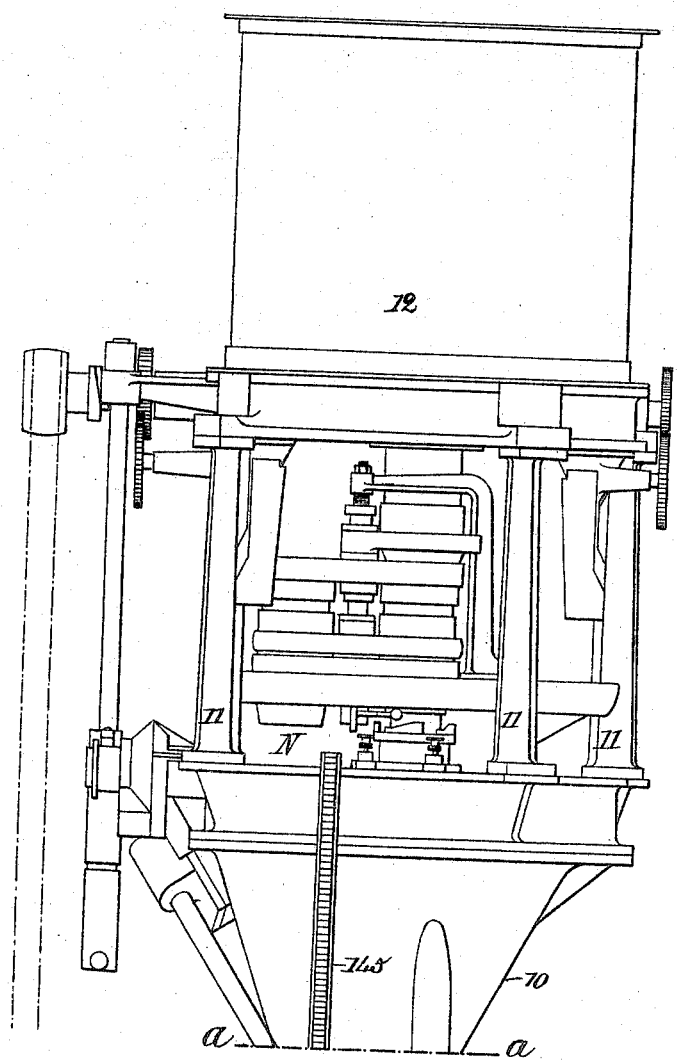

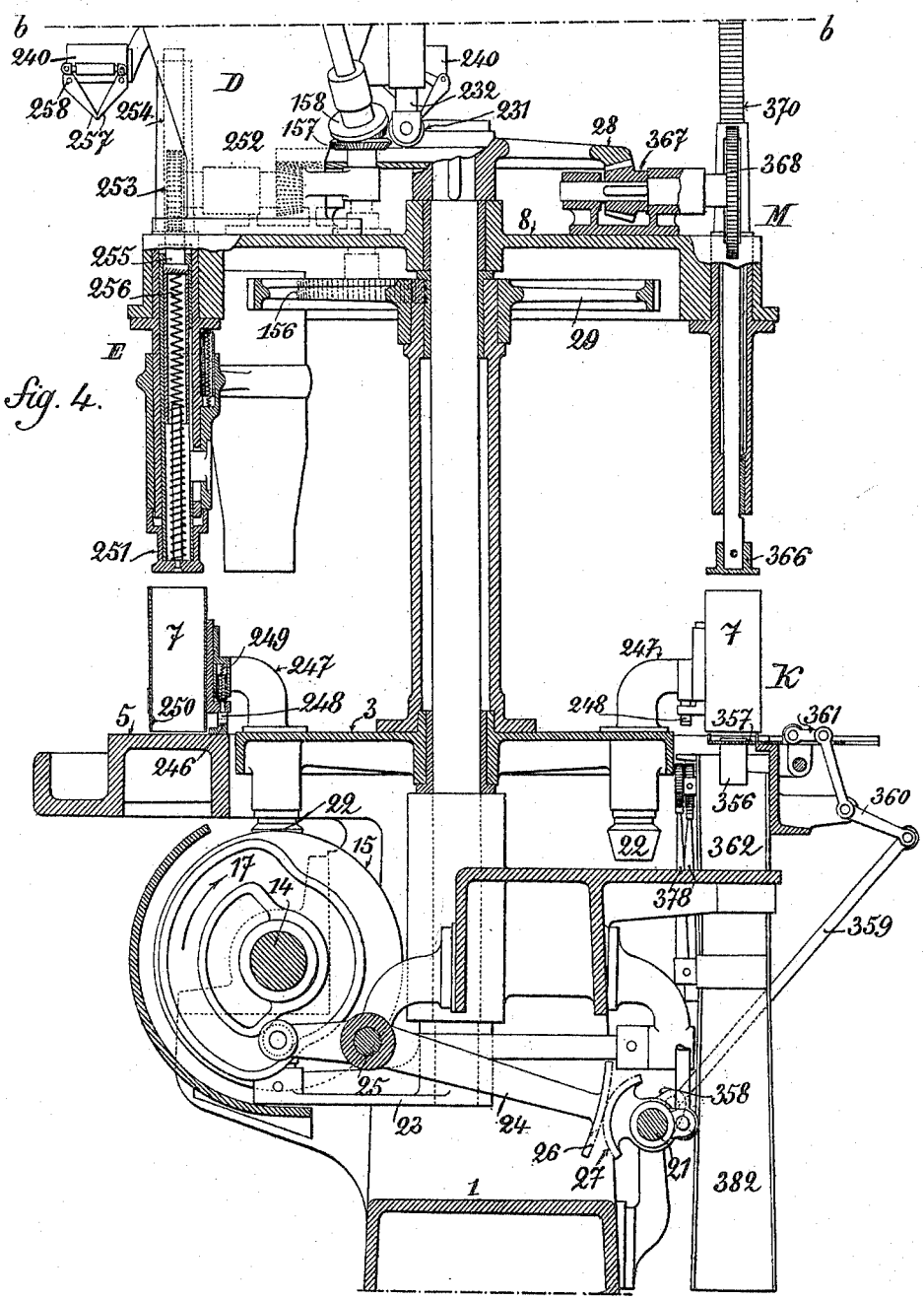

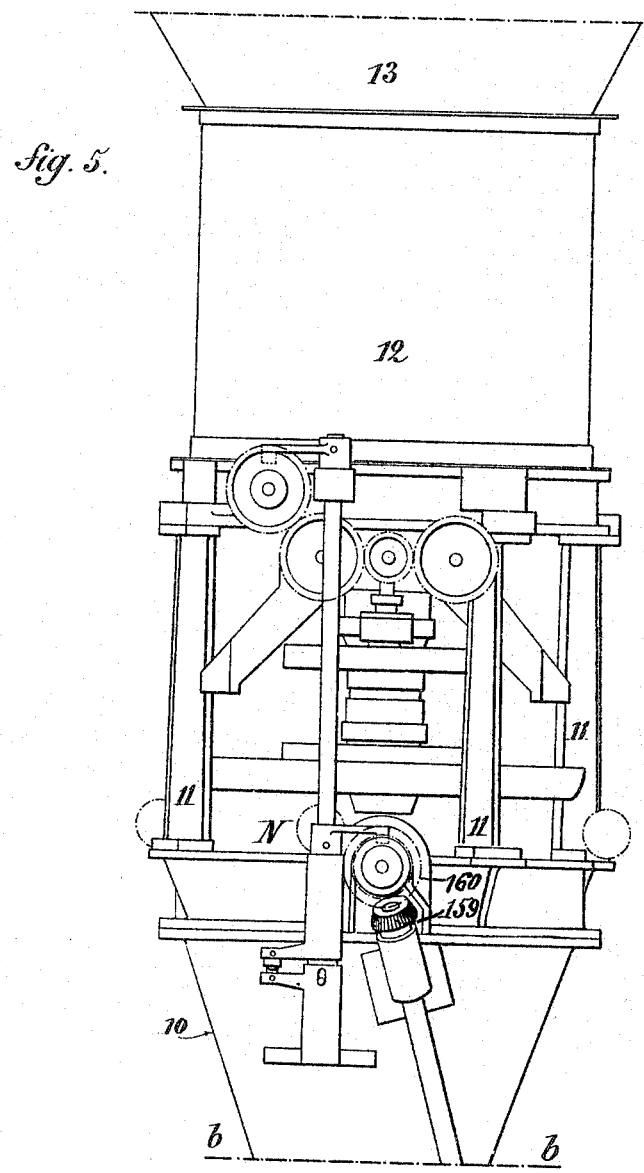

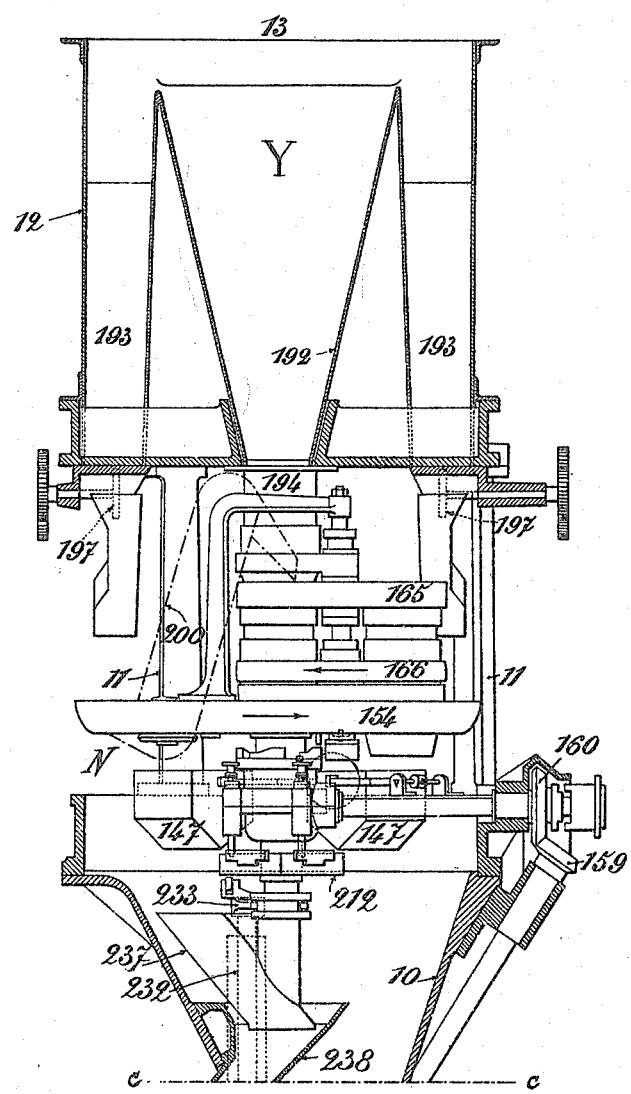

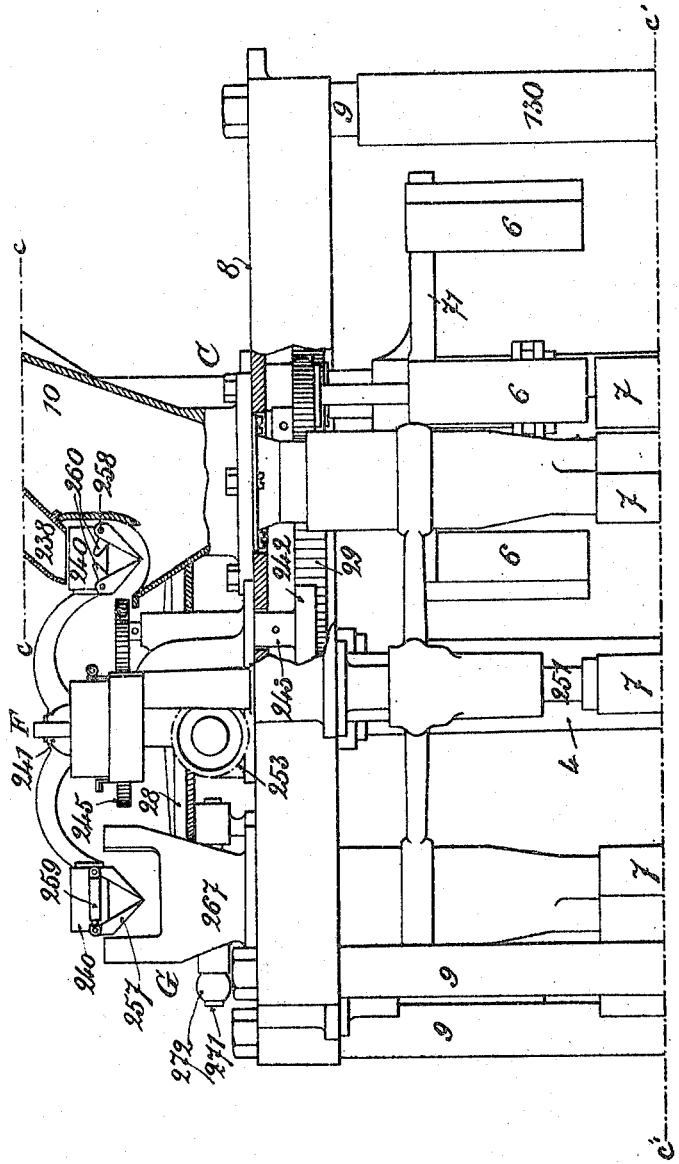

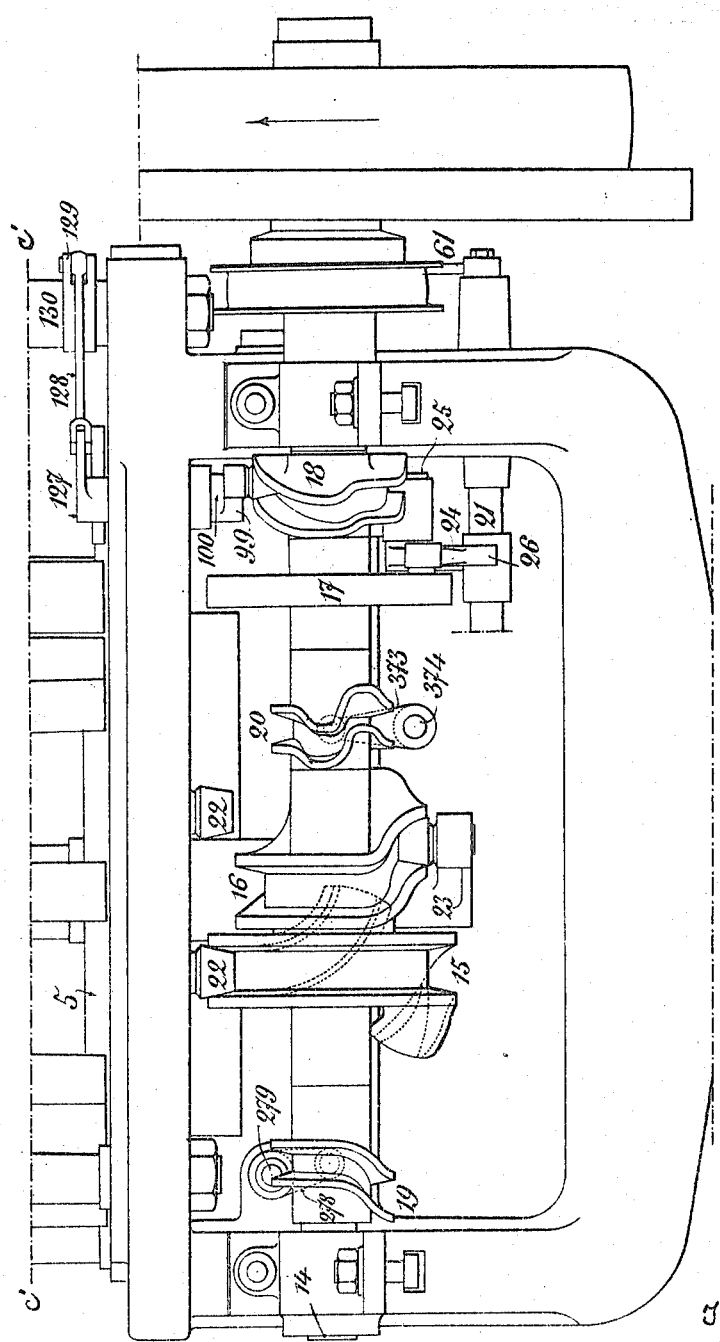

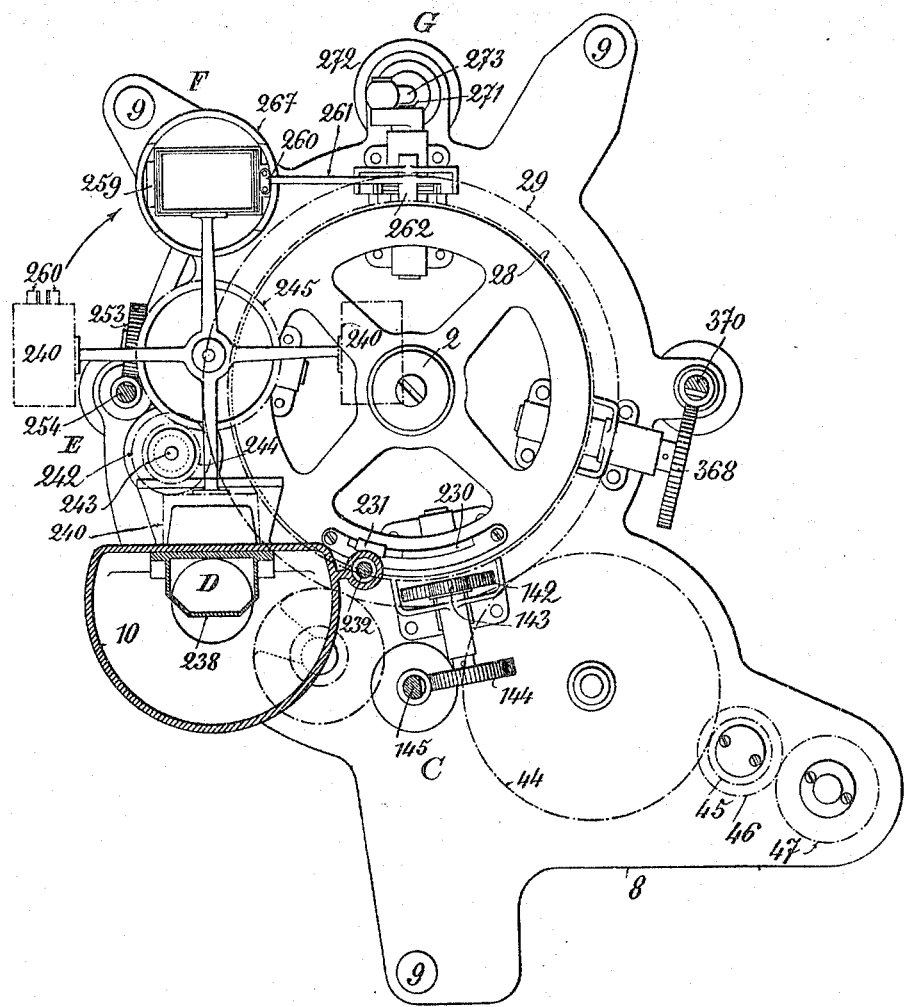

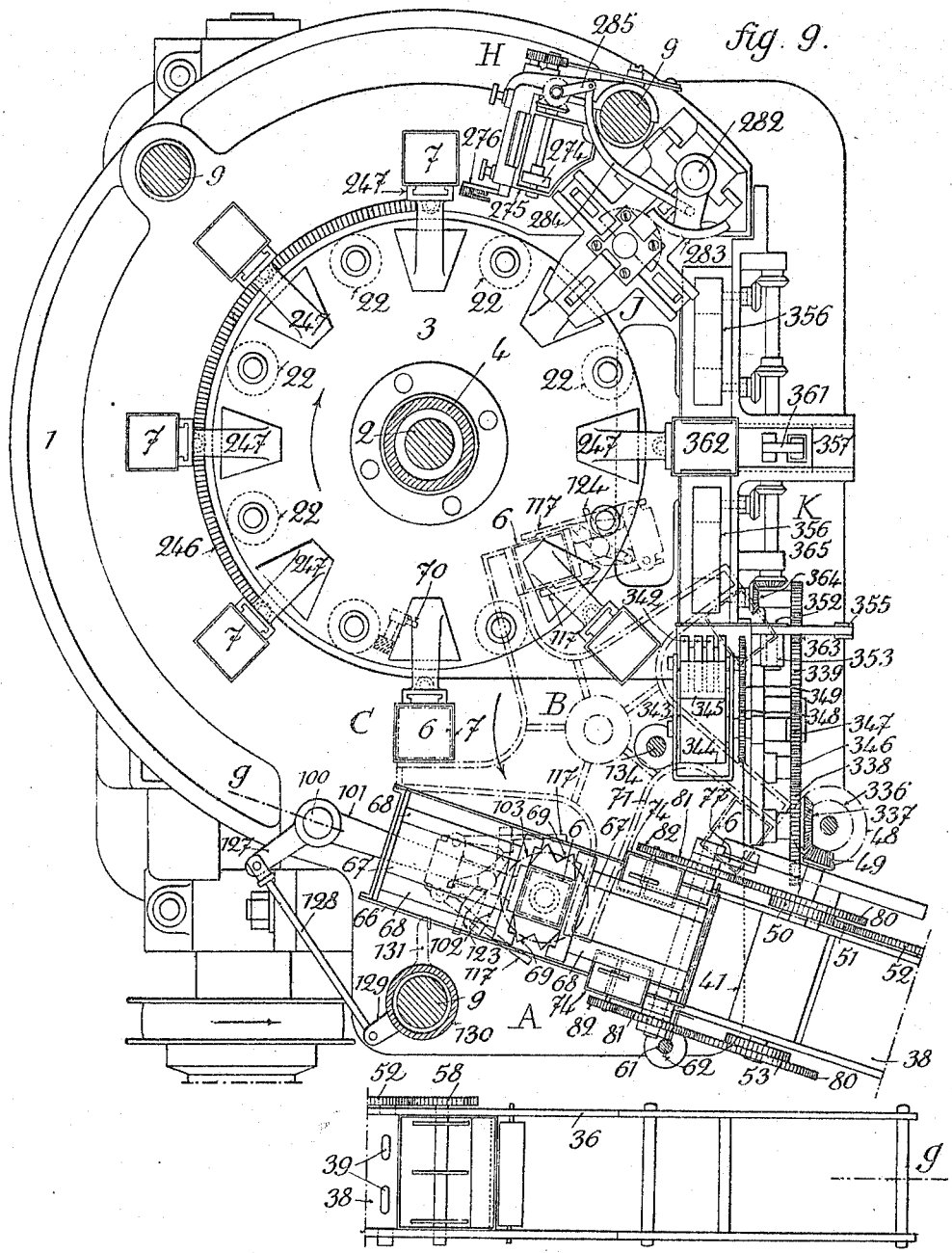

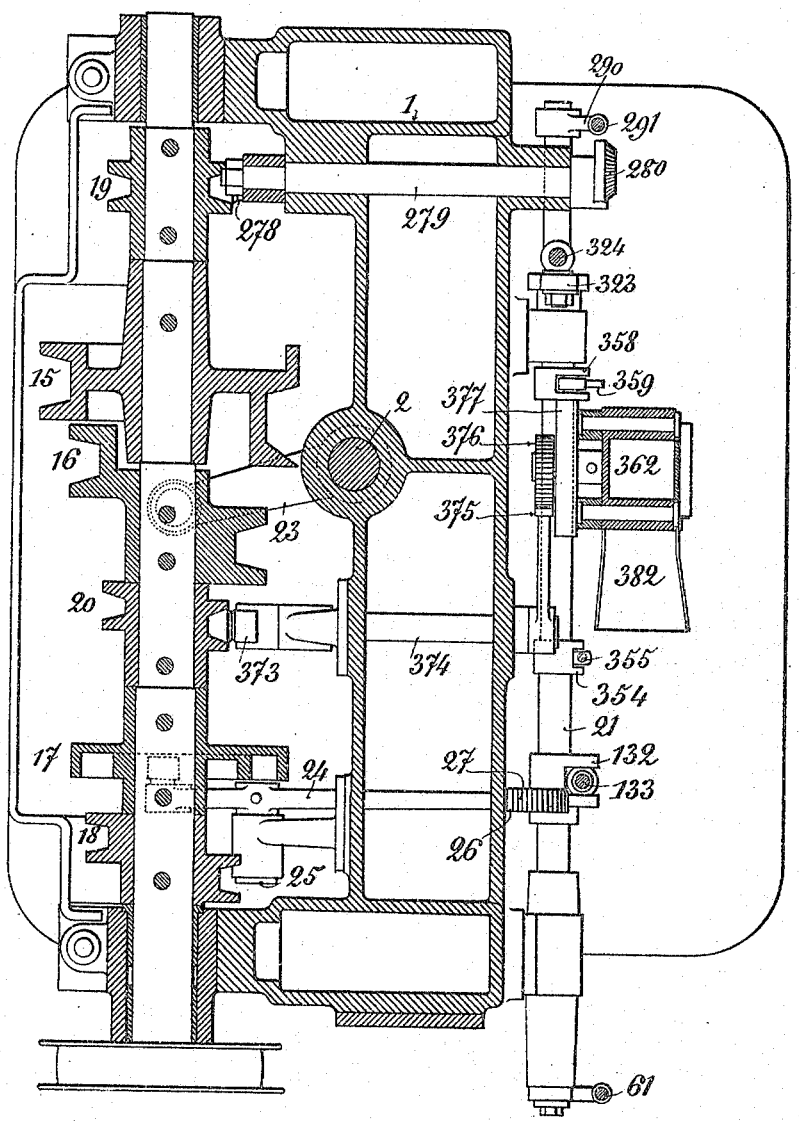

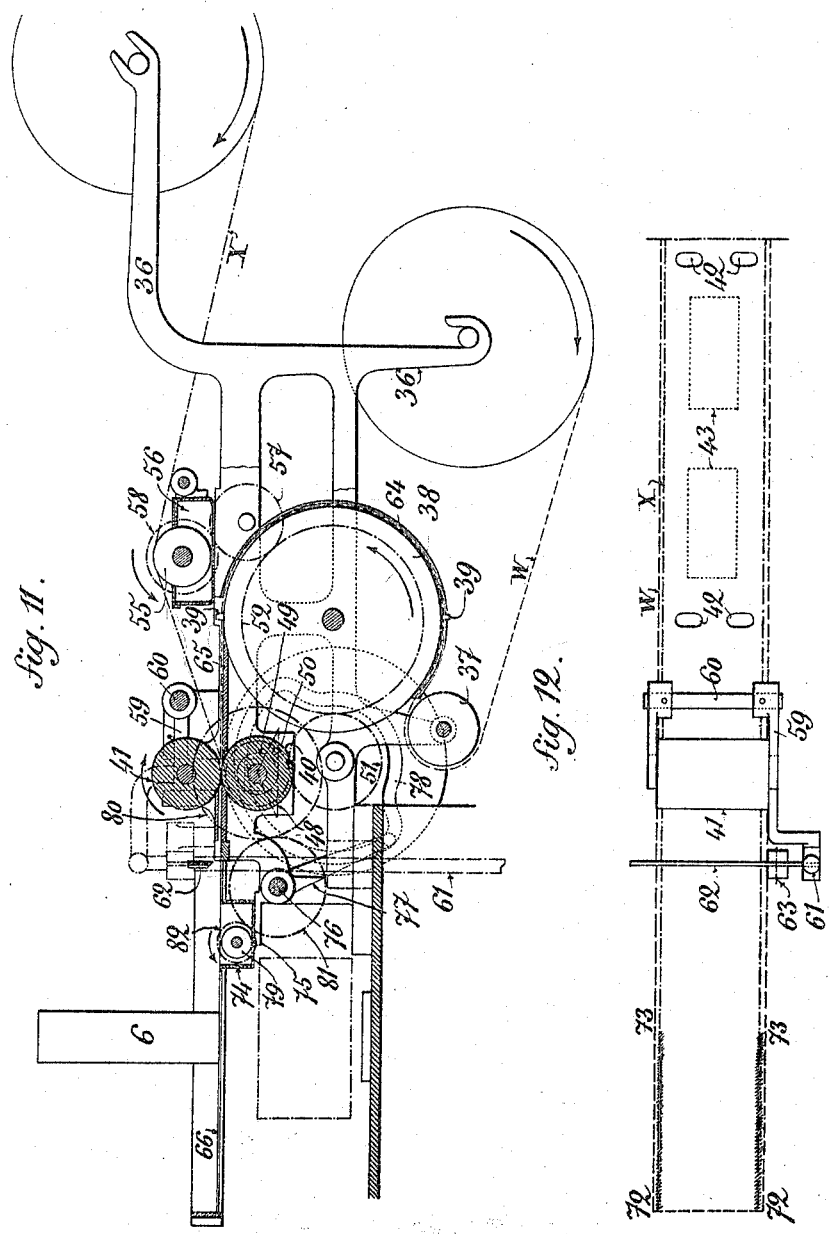

J. BARDET.
PARCELING MACHINE.
APPLICATION FILED JAN. 29, 1906.
957,833.
Patented May 10, 1910.
19 SHEETS—SHEET 13.
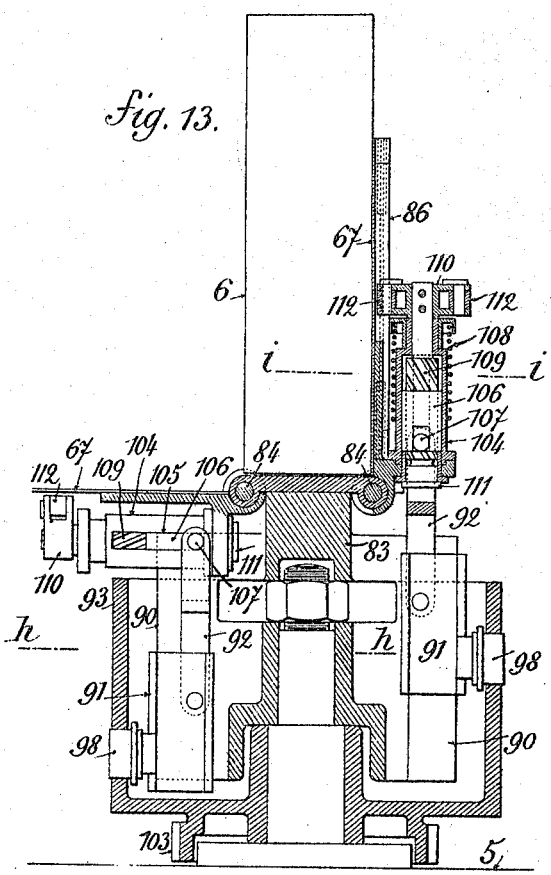
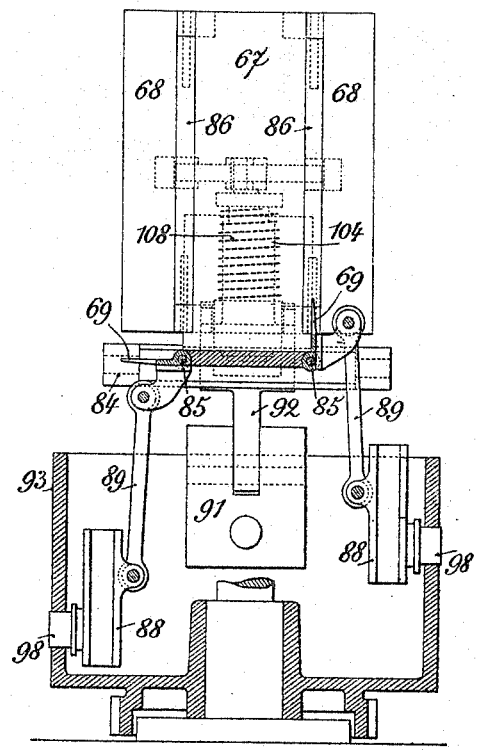
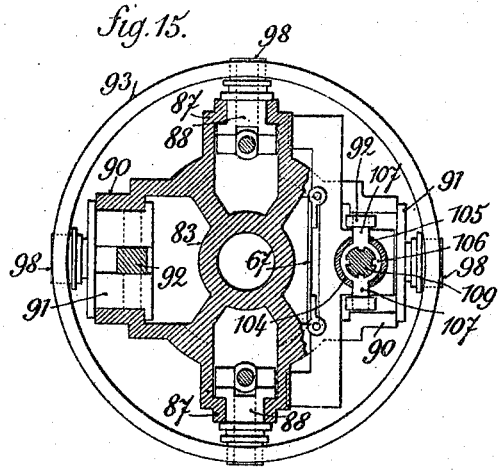
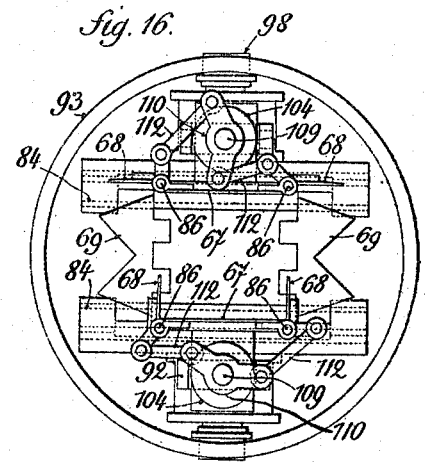
Witnesses
C. R. Hardy
O. B. Hopkins
Inventor
J. Bardet
by H. B. Willson &Co
Attorneys

J. BARDET.
PARCELING MACHINE.
APPLICATION FILED JAN. 29, 1906.

957,833.

Patented May 10, 1910.
19 SHEETS—SHEET 14.

Witnesses
C. R. Hardy
O. B. Hopkins

Inventor
J. Bardet
by H. B. Willson & Co.
Attorneys

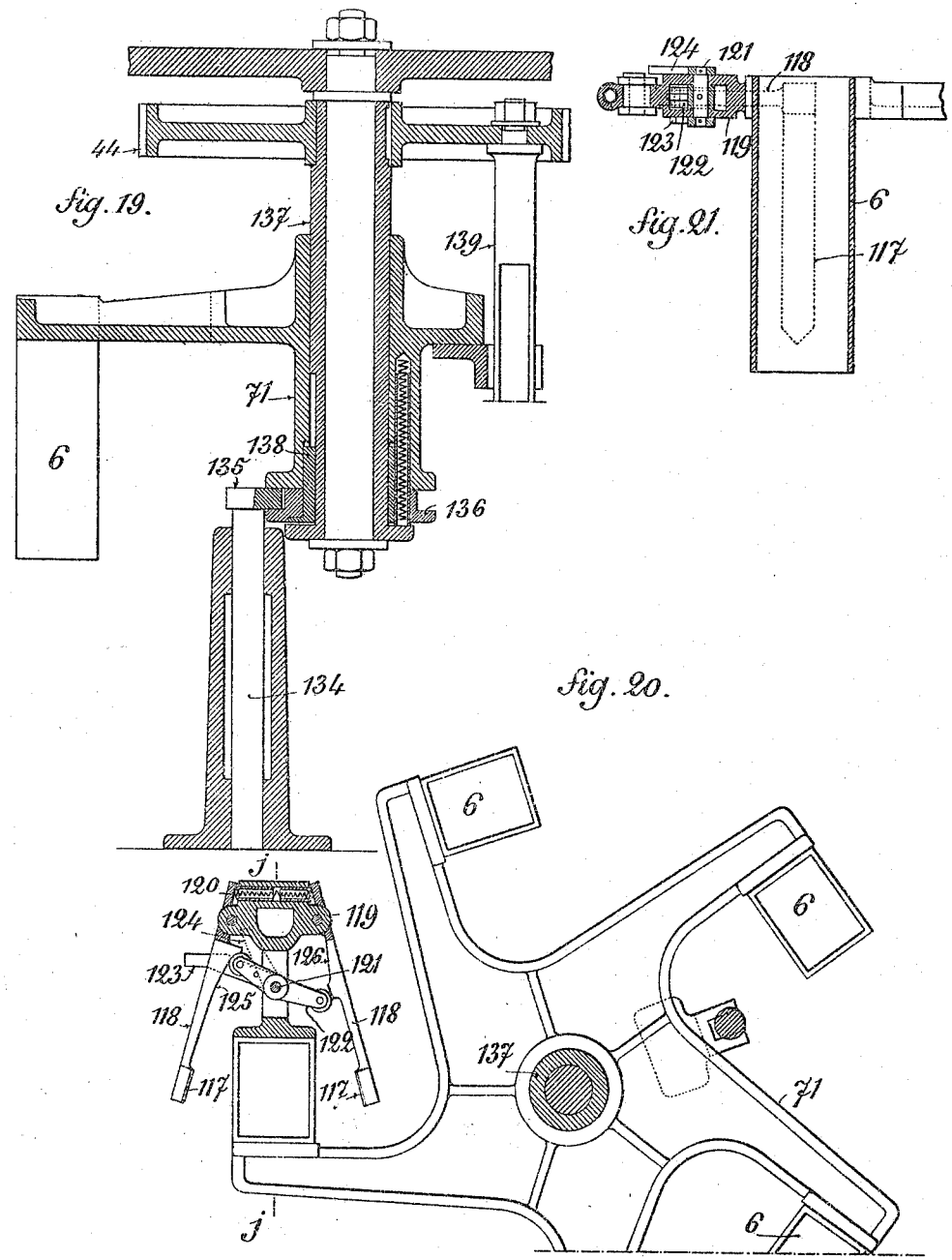

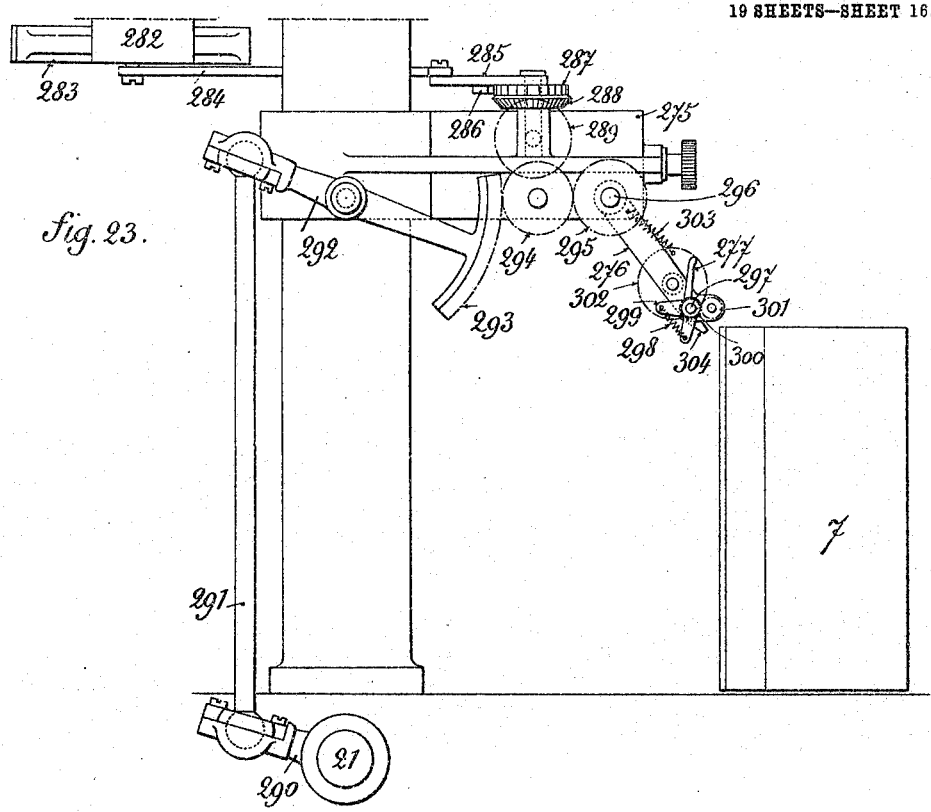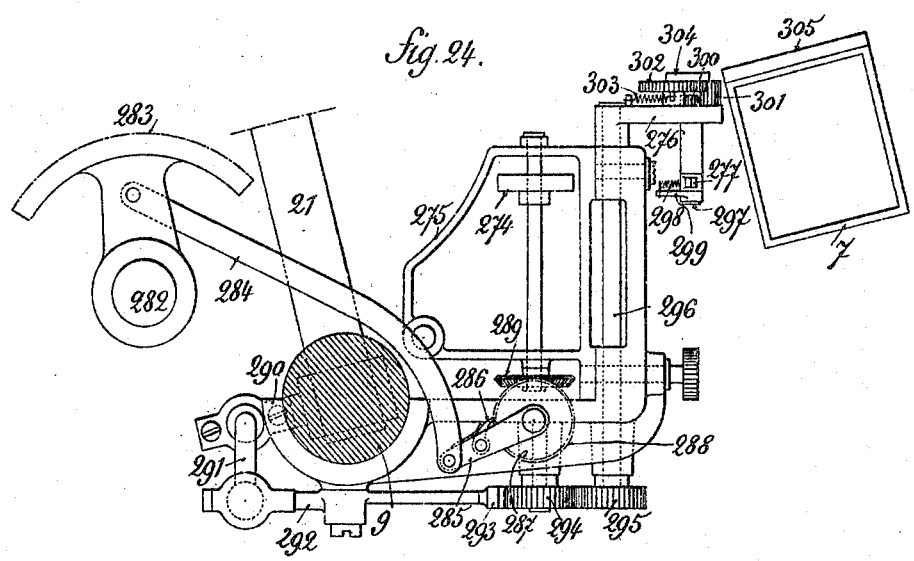

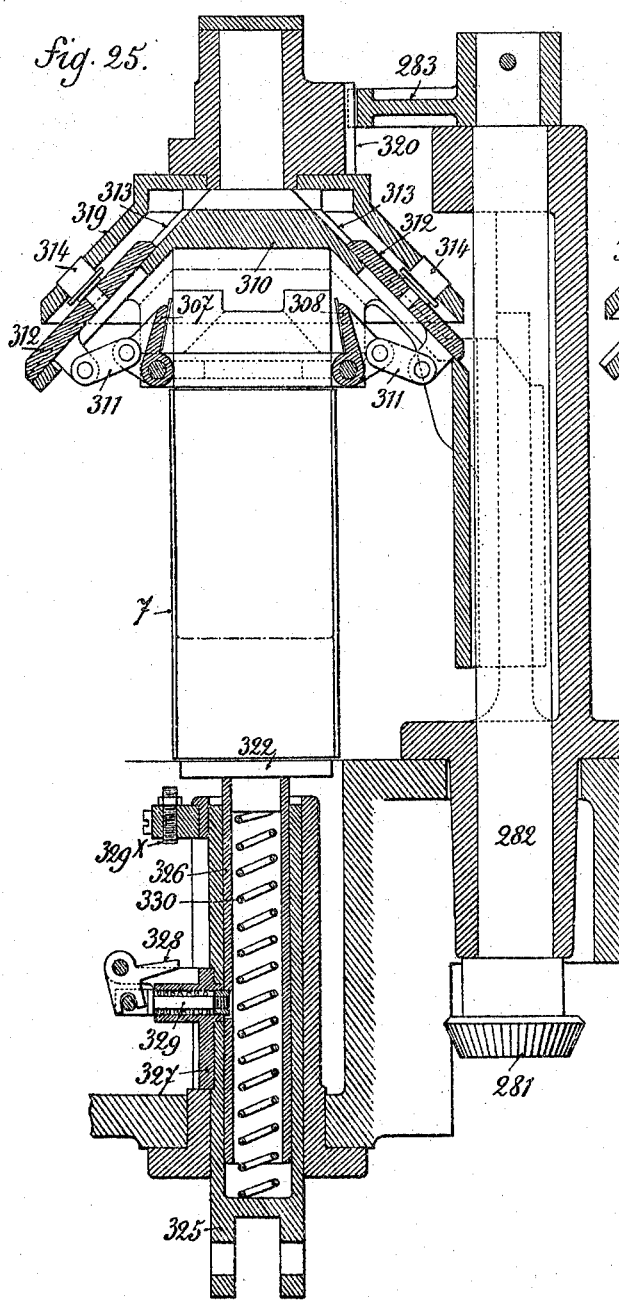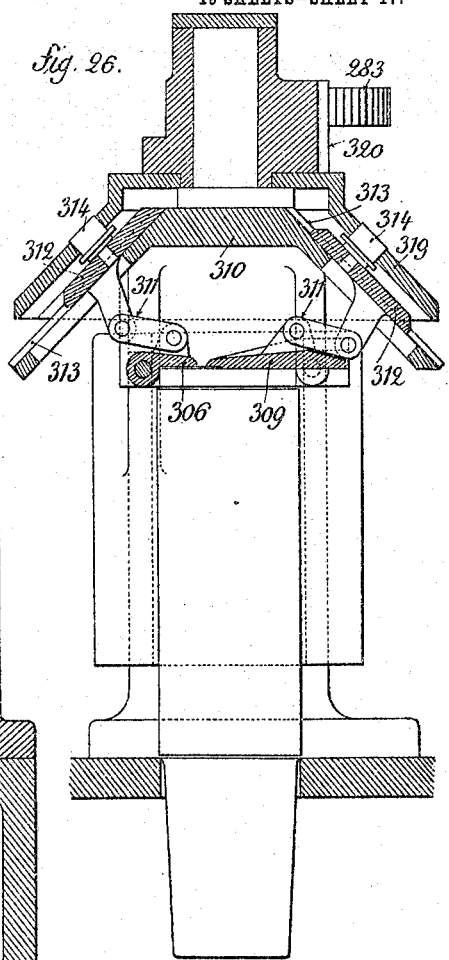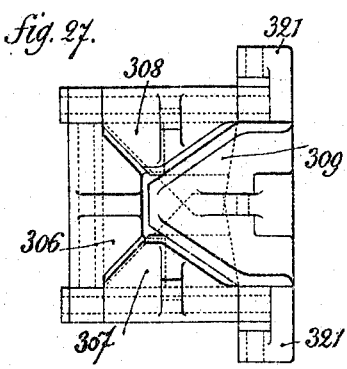

J. BARDET.
PARCELING MACHINE.
APPLICATION FILED JAN. 29, 1906.

957,833.

Patented May 10, 1910.
19 SHEETS—SHEET 18.

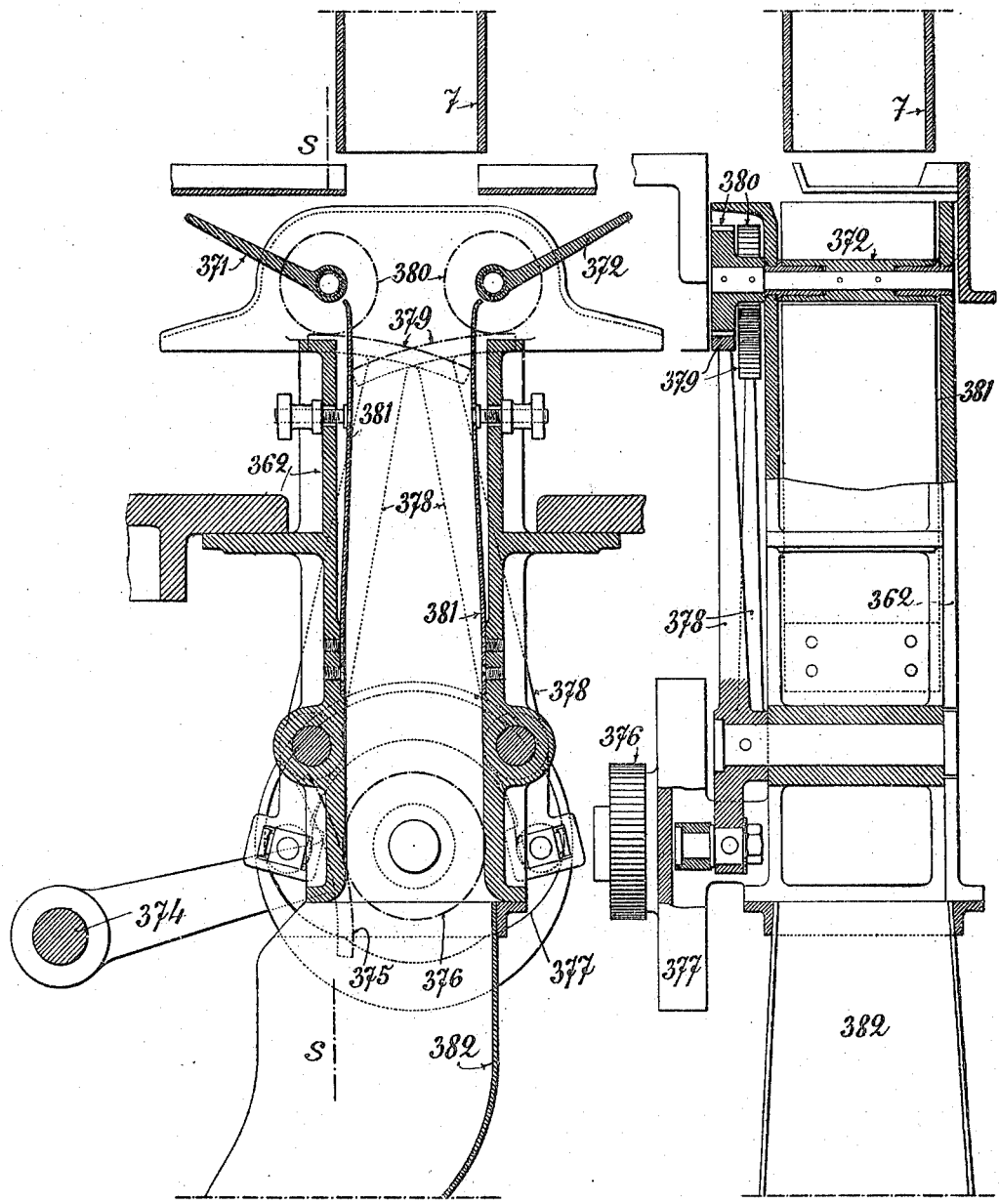

UNITED STATES PATENT OFFICE.

JEAN BARDET, OF PARIS, FRANCE.

PARCELING-MACHINE.

957,833.

Specification of Letters Patent. Patented May 10, 1910.

Application filed January 29, 1906. Serial No. 298,480.

*To all whom it may concern:*

Be it known that I, JEAN BARDET, a citizen of the Republic of France, residing at 69 Rue d'Hauteville, Paris, in the Republic of France, engineer, have invented certain new and useful Improvements in and Relating to Parceling-Machines, of which the following is a specification.

My invention relates to a machine for putting up into parcels, all kinds of materials which are either powdered, grained, or granulated the said parcels each comprising a wrapper or bag in which is inclosed a quantity of material of a predetermined weight, and a safety strip surrounding the said wrapper, while the material for making up these parcels or cartons is supplied to the machine in a continuous manner. The said machine is so arranged as to cut the continuous sheets or strips of paper into lengths suitable for forming the wrappers and safety strips, and to divide also the stuff which it is desired to put up into parcels, into quantities of a predetermined weight. The machine also comprises means for folding and pasting pieces of paper in the form of wrappers and means for feeding into each bag a previously weighed quantity of stuff; means for closing the said bag, and also for folding and pasting around the latter a safety strip.

An important feature of the invention resides in the fact that the several mechanisms which serve to fill the bags, close, and surround the same with a safety strip, are grouped around a revolving horizontal plate, while at the center of the plate are arranged two concentric vertical shafts which receive from a driving shaft situated horizontally underneath, intermittent motions, and serve to actuate the said mechanisms. Such an arrangement allows of the cams and other operating parts being reduced to a minimum notwithstanding the multiplicity of the operations to be effected; it also renders the machine as little cumbersome as possible.

Another important feature of the invention consists in the filling of the bags in two operations instead of one the quantity of stuff weighed being divided into two substantially equal portions one of which is introduced into the bag and packed down therein before the other portion is introduced.

In the machine which I will now proceed to describe, the weighing of the material to be put up is effected by means of a device which forms the subject-matter of a separate and distinct invention which is described in application for French Patent No. 350860 filed January 19th 1905 and British Letters Patent No. 1674 of 1905.

The accompanying drawing shows one embodiment of my invention, the machine thus incorporating the invention being, for greater clearness, shown as representing a machine for making up tea into parcels. In this form of carrying out the invention, the wrapper is made up of two sheets of paper one of which serves as an inner lining, while the other, forming the outer wrapper, is printed; the safety strip is also printed.

Figure 22:
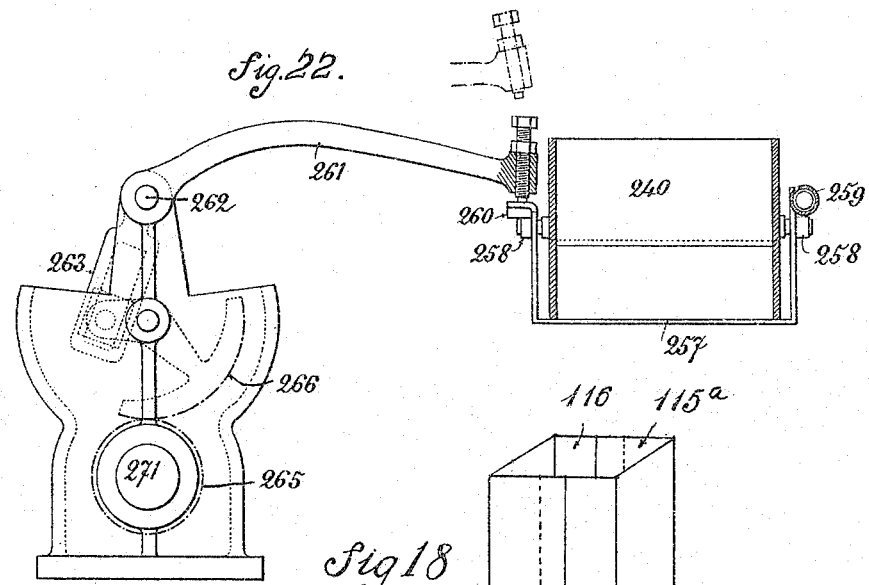
Figure 18:
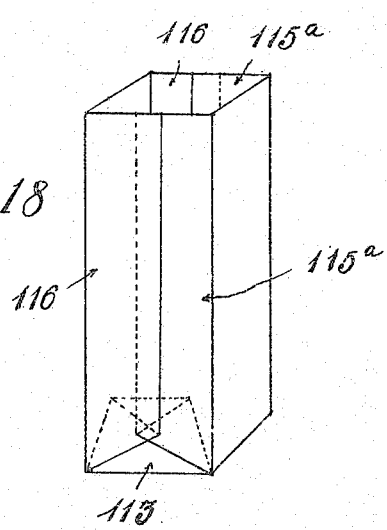
Figure 28:
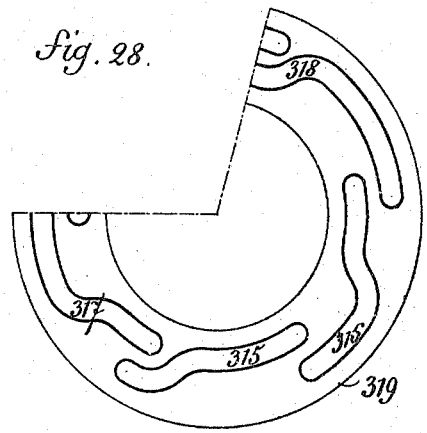
Figure 29:
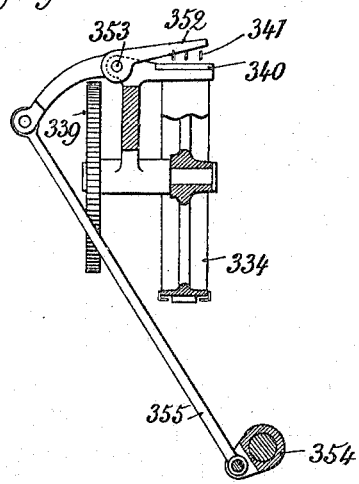
Figure 30:
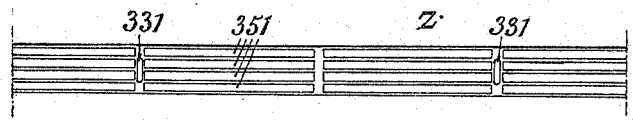

In the said drawings: Figure 1 is a diagrammatic view showing the series of operations necessary for filling, closing, and putting the strip around the wrapper. Figs. 2, $2^a$ and 3 represent in three views a front elevation of the machine, the devices for making the bag, being removed; the said parts shown in Figs. 3 and 2 coming together on the line $a$—$a$ and the parts shown in Figs. 2 and $2^a$ coming together on the dotted line $a'$—$a'$. Figs. 4 and 5 represent in two views a vertical side elevation partly in section of the machine; the said parts coming together on the line $b$—$b$. Figs. 6, 7 and $7^a$ represent in three views a rear elevation of the machine, coming together on the lines $c$—$c$, $c'$, $c'$. Figs. 8, 9, and 10 are horizontal sections on the lines $d$—$d$, $e$—$e$, of Fig. 2 and $f$—$f$ of Fig. $2^a$ respectively. In Fig. 9, certain parts of a device for feeding the paper are removed. Fig. 11 is a vertical section of the device for feeding the paper and making the bag, the said section being taken on the line $g$—$g$ of Fig. 9. Fig. 12 is a plan view showing the upper part of the device for feeding the paper for the making of the bag. Figs. 13 to 17 are detail views of a device for making the bag; Fig. 13 being a vertical section showing one folding shutter as being down and the other as being up, Fig. 14 a vertical section perpendicular to the previous one, the journal of the shutters being split; Fig. 15 a plan view in section taken on the lines $h$—$h$ and $i$—$i$ of Fig. 13. Fig. 16 a top plan view of the device; and Fig. 17 shows the development of a cam for operating the shutter. Fig. 18 is a perspective view of an open bag or receptacle. Fig. 19 is a vertical section of a support for the molds. Fig. 20 is a plan of the same. Fig. 21 is a vertical section taken on the line $j—j$ of Fig. 20. Fig. 22 is an elevation of a device for opening the charging pocket. Figs. 23 and 24 are, respectively, an elevation and a plan of the device for pasting the bag. Figs. 25 and 26 are vertical sections of the device for closing the bag. Fig. 27 is a plan view of the shutter, for closing the bag. Fig. 28 shows the development of a conical cam for operating the said shutter. Fig. 29 is a vertical section of the device for putting the bag under a strip, the said section being taken on the line $r—r$ of Fig. $2^a$. Fig. 30 is a plan view of a strip coated with lines of paste. Fig. 31 is a vertical section of a device for folding the strip around the bag; and Fig. 32 is a vertical section taken on the line $s—s$ of Fig. 31.

Referring to the drawings the diagram in Fig. 1 is intended to show, as a whole, the operation of the machine, and the materials supplied to the latter are indicated at W X Y Z: W being a continuous web of printed paper for forming the outer wrapper of the bags, X a narrower continuous web of paper for forming the inner lining of the wrappers, Y designates the tea to be divided and made up into parcels, and Z the continuous web of printed paper to be pasted around the packet of tea so as to cover the folds of the bag. The webs W and X, fed together and pasted one to the other at 41, are cut at 62, and the double piece of paper thus cut off is folded around a suitable mold 6 so as to form a bag V. The latter is conveyed with the mold above a box 7 and is lowered by a piston or plunger 140 which separates the bag from the mold and introduces it into the said box. The bag is then fed by the box 7 on to D, under a funnel 10, which introduces into the same a quantity of tea about equal to half the quantity weighed in the weighing receptacle 147; the other half of the tea weighed out by the weighing apparatus is received in a pocket 240. The half-filled bag is then conveyed to E, beneath a piston or plunger 251 which rams the tea down after which the bag is conveyed to F, beneath a funnel 267, into which the pocket 240 transferred to R, supplies its contents to make up the full complement of tea weighed by the balance 147. The bag is then conveyed to G where its contents are rammed down by a piston or plunger 270. In its further movement from G to J the bag is pasted at H so that when folded at J it remains closed. The bag is finally conveyed to K situated above a slip of paper severed from the continuous strip Z by a cutter 352, coated with paste by means of a pasting device S. At K a piston or plunger 366 pushes the bag down so that the strip Z is folded and pasted to the sides of the bag. The latter being thus rammed down to T, closing devices 371, 372 press the slip of paper into contact with the bag after which the finished packet of tea is expelled from the machine by a further forward movement of the piston or plunger 366.

Before describing in detail the mechanisms which effect the above described operations, I will proceed to set forth the general arrangement of the machine with reference to Figs. 2 to 10. In these figures, a vertical shaft 2 is rotatably mounted in the frame of the machine 1 said shaft being surrounded by a hollow shaft or sleeve 3 carrying a plate member 4 integral therewith, Figs. 4 and 9, adapted to rotate. The main frame comprises a table 5 extending around the plate 3 which table carries at A, the devices for making the bag; at B, the devices for conveying the bags from the molds 6 to the boxes 7; at H the devices for pasting the filled bag; at J, the devices for closing the bag and at K the devices for applying the paper strip or slip to the bag. Above the table 5, a platform 8 is supported by three pillars 9, said platform having arranged at C, the device for introducing the bags into the boxes 7; at D, the device for effecting the first half-filling of the bag; at E, the device which produces the first ramming down of the tea in the bag; at F, the devices which convey and feed into the bag the second half of the tea which has been weighed; at G, the device for ramming down a second time the contents of the bag, and at M, the device which forces the filled and closed bag down into the device K for putting the slip of paper around the bag. The platform 8 also supports a hopper 10, above which four standards 11 hold a reservoir 12, on the top of which is a hopper 13 containing the tea to be weighed and made up into parcels. On the upper crown of the hopper 10 are fitted, at N, the weighing devices. To control or actuate these several devices, the machine comprises a horizontal driving shaft 14 intended to receive a continuous rotary motion through the medium of any suitable gearing. On the said shaft are fixed the cams 15, 16, 17, 18, 19, and 20 the first three of which actuate respectively, the vertical shafts 4, 2 and the horizontal shaft 21. For that purpose the plate 3 carries on its lower face eight rollers 22 mounted upon pendent studs and the cam 15 acts successively on said rollers in such a manner that, through its groove which is of suitable shape, at each revolution of the driving shaft, the plate 3 and hollow shaft or sleeve 4 are caused to rotate one-eighth of a revolution in the direction indicated in Fig. 9. The cam 16 acts on a lever 23 fixed to the shaft 2, and thus imparts to the latter an angular reciprocation. Finally, the cam 17 imparts a rocking motion to the lever 24 mounted upon a stud shaft 25, and provided with a toothed segment 26 which meshes with a toothed segment 27 fixed on the shaft 21, so that a rocking motion is also imparted to the latter. The three shafts 2, 4, and 21 are generally sufficient to control or actuate most of the mechanisms designated from A to N. For that purpose, the shaft 2 carries a bevel wheel 28 Fig. 4, the shaft 4 a spur wheel 29 and the shaft 21 a series of cranks 132, 354, 358, 323, 290.

I will now proceed to describe the devices which coöperate successively in making a parcel or packet.

*The making of the bag.*—The web of paper W unwinds from a spool carried by a bracket 36 (see Figs. 9 and 11) and passes around a guide roller 37 and a drum 38 provided with guide pins 39, and from thence passing between the feed rollers 40 and 41. The web W before being mounted upon the spool is printed and perforated, the printing being indicated by rectangles 43, dotted lines Fig. 12, and the perforations being designated 42. These perforations admit of the guide pins 39 engaging therewith so as to advance the web a predetermined distance notwithstanding the variations in the length of the paper due to atmospheric humidity or other hygrometrical influences.

For the purpose of advancing the web the sheave 38 receives from the wheel 29 intermittent rotary motion through the medium of the gear wheels 44, 45, 46, 47, 48, 49, 50, 51 and 52, so that the sheave 38 makes half a revolution each time the wheel 29 rotates one-eighth of a revolution. At the same time the feed roller 40, mounted on the shaft of the wheels 49 and 50, rotates in such a manner as to cause the paper to move forward a distance equal to that between two consecutive sets of perforations 42, which corresponds to the length of web necessary to make a bag. The roller 41 is geared to the roller 40 by uniform gear wheels 53 and 54, and therefore have the same peripheral speed, both rollers pressing sufficiently on the paper to make the latter move forward. Simultaneously with the forward feed of the web W the feed rollers 40 and 41 move the lining web X, forward, said web being unwound from a spool also carried by the bracket 36. The web X passes over the pasting mollets 55, located in a pasting receptacle 56, said mollets being rotated by the gear wheels 52, 57, 58, and having a peripheral speed somewhat greater than the speed of the paper and they deposit continuous lines of paste along the edges and the middle of the web X, so that the latter is securely pasted on to the web W in its passage between the rollers 40 and 41. The roller 41 is carried by a frame 59, rocking on a fixed shaft 60, and receiving from the shaft 21 a rocking motion through the medium of a pitman 61 which actuates a cutter 62 rocking on a shaft 63 so that when the webs W X have been moved properly forward, the roller 41, is moved up and the cutter 62 is moved down, whereby the part of the web W comprised between the roller 40 and the drum 38 may expand or contract freely before being severed, in case hygrometrical variations should have altered the distance provided for between the perforations 42. Consequently, the influence of such hygrometric variations is constantly nullified, and their accumulation, which would completely destroy the register of the printing 43 with the cutter is avoided, as also is the production of too much pull on the paper.

The web W is held with a certain amount of play on the drum 38 by a circular guide 64, which permits the passage between them of the pins 39; moreover, the web is sustained in the interval between the drum 38 and the rollers 40, 41, by a small table 65. One end piece of the web W X, severed by the cutter 62, lies on lateral slide-ways 66 above the folding shutters 67, 68 and 69, and under a mold 6. The mold consists of a hollow parallelepipedon block open at the top and bottom, and is fixed by its upper part to one of the supporting arms of a bracket 71, which can be rotated and moved up. Two long shutters 67 (see Figs. 13 and 15) are adapted to be applied against two opposite faces of said block or mold, while narrow shutters 68 and the short shutters 69 are adapted to close against the two other faces of the mold, thus folding the sheet of paper into the shape of the bag shown in Fig. 18, the mode of folding being well known *per se*. The making of the bag according to this method or process involves the pasting of the sheet of paper on the portions 72, 73 of its longitudinal edges (see Fig. 12), and for this purpose two paste cups 74 (Fig. 11) are mounted on a frame 75, swinging on a shaft 76 said frame having arms 77 operated by a cam 78 mounted upon the shaft of the wheel 51. In each of the paste cups 74 a mollet 79, which receives from a toothed wheel 80 fixed to the shaft of the roller 40, a movement of rotation through the medium of the toothed wheels 81 and 82, mounted on the frame 75. The cam 78 is so shaped as to lift up the pasting mollets 79 at the time when the paper is being moved forward, so that the portion 72, 73 of the edges of the paper are pasted, after which the mollets are moved down until the web W X is again moved forward.

The device for folding the paper comprises a bracket 83 (see Figs. 13 and 16), fixed on the table 5 of the main frame, and on which the shutters 67 and 69 are hinged on shafts 84 and 85; the shutters 68 are connected to the shutters 67 by hinges 86. In the bracket 83 are formed vertical slide-ways 87, in which move the slides 88, connected by links 89 to the shutters 69; other slide-ways 90 are also formed in the bracket 83 and receive the slides 91 which actuate the shutters 67, through the medium of the link 92. The vertical movements of the slides 88 and 91 are effected by means of a hollow cylindrical cam 93, provided with cam grooves 94, 95, 96, 97 (see Fig. 17), in which are engaged cam rollers 98 carried by the slides, the said cam receiving from the cam 18 on the driving shaft a rocking motion through a lever 99, a vertical shaft 100, a lever 101 provided with a toothed segment 102, and teeth 103 formed on the cam 93.

The shutters 68 are actuated by the same slides 91 as the shutters 67, and each shutter 67 carries a socket 104, having two lateral slots 105, and in which socket a nut 106 is slidable; the said nut is connected to the link 92 by two journals 107, which pass through the slots 105 and prevent the said nut from rotating. A spiral spring 108, bearing upon the upper or outer part of the socket 104, acts upon the journals 107 so as to yieldingly maintain the nut 106 at the bottom of the said socket, while through the nut a screw 109 passes having heads 110 and 111 which prevent it from sliding in the socket 104, the head 110 being connected by two links 112 to the shutters 68, so as to cause the latter to pivot on their hinges 86 when the screw 109 turns, that is when the nut 106 slides in the socket 104.

The operation of this device is as follows: When a sheet of paper, fed to the lowered shutters 67, 68, 69 has been severed by the cutter 62, the cam 93 is actuated and produces in the first place, through the medium of the slide-ways 94 and 95 the upward movement of the shutters 67 which carry up with them the shutters 68 and move up the two ends of the sheet on to the corresponding faces of the mold 6, then the shutters 69 are moved up in their turn by the action of the slide-ways 96, 97, so as to apply against the other faces of the mold the lateral portions 113 of the middle of the sheet. One of the slides 91 is then moved farther up by the portion 114 of the slide-way 94, so that the nut 106 rises along the screw 109 and causes the same to turn, at the same time that it compresses the spring 108; on account of the rotation of the screw 109, the corresponding shutters 68 are caused to turn so as to apply against the mold the lateral portions 115ª of one end of the sheet, and to fold against the shutters 69 the intermediate portions of the said sheet. Finally, the other slide 91 is moved up by a portion 115 of the slide-way 95 and produces, through the medium of the link 92, nut 106 of the screw 109, and the links 112, the rotation of the corresponding shutters 68, so as to apply the lateral portions 116 of the other end of the sheet with their pasted or gummed edges against the mold and against the edge of the portions 115ª.

On the backward rotation of the cam 93, the shutters 67, 68, 69 are actuated successively in the inverse order to the previous one and are thus brought back to their initial positions. During the return period, clips 117 (see Figs. 20 and 21) are applied against the pasted parts of the bag as soon as the shutters 68 are opened, so as to insure the pasting and hold the bag on the mold 6, furthermore, the said mold is lifted up together with the clips and the bag, before the shutters 69 move down, in order to previously disengage the latter from the folds of the bag which cover the same. For that purpose, the clips 117 consist of thin plates fixed to arms 118, pivotally mounted on a bracket 119 integral with the mold, and which arms receive a turning tendency in the direction of the closing of the clips, from the action of the spring 120. In the bracket 119 is also mounted a rotary spindle 121 carrying a cross-bar 122 having two fingers 123 and 124; the cross-bar acts by its ends on the inner sides of the arms 118, which are provided with inclined planes 125, 126, so that, on the shaft 121 being turned in one direction, the clips are opened and fixedly held in that position, whereas they are closed under the action of the spring 120 when the shaft 121 is turned in the opposite direction. The closing of the clips is effected by the cam 18 which had before actuated the folding shutters 67, 68, 69 through the medium of the lever 99, the shaft 100, lever 127, link 128, lever 129, hollow shaft 130 and a lever 131, which acts on the finger 123 (see Fig. 9). In the second place, the up-lifting of the mold 6 is produced by the rock shaft 21, through the medium of a crank 132, a pitman 133, a sliding rod 134, and a fork 135 engaged in a circular groove 136 of the bracket 71 (see Fig. 19).

On the shutters 67, 68, 69 being moved down into horizontal position, the mold is conveyed with the finished bag above a box 7, on account of the bracket 71, having been turned in the direction shown in Fig. 9. This rotation is produced intermittently by means of a wheel 29, through the medium of the wheel 44 and of the hollow shaft 137; the bracket 71 being slidably mounted on the shaft 137 to which it is splined at 138, it being also connected to the wheel 44 by a guide 139. The bag is thus fed on to C above a box 7. During this displacement the finger 124 comes against a buffer 70 (see Fig. 9) fixed to the platform 8, so that the clips 117 are caused to open and release the bag they are maintaining on the mold. The said bag is then introduced into the box by the lowering of a ram or plunger 140, movable through the mold 6 and the box 7.

The ram 140 receives from the bevel wheel 28 fixed to the shaft 2 a vertical reciprocation through the medium of a bevel pinion 141, spur wheels 142 and 143 Figs. 2 and 3 and a toothed wheel 144 which meshes with a toothed rack 145 formed on the plunger or ram rod. On account of the intermittent rotation of the plate 3 the bag is conveyed in the box 7 to D below the funnel 10 to receive a charge of tea.

*Filling the bags.*—In this machine the filling of the bags is done in two operations, each of which is followed by a ramming or packing operation, in order to reduce as much as possible the volume of the material to be made up into parcels. For that purpose, the charge or load is first separated from the supply of tea Y contained in the reservoir or store 12, and exactly weighed by means of a system of balances such described in the specification of application for French Patent No. 350860 filed January 19th 1905 and British Letters Patent No. 1674 filed January 27th 1905, which system comprises four balances the receptacles 147 of which are suspended to beams 146 having balance-weights 148, the bottom of the said receptacles being provided with shutters so arranged as to be opened automatically by means of a suitable device. When a balance receptacle 147 is opened by the said device, its contents are delivered, one half approximately into a hopper 10, and the other half into a rotary funnel 237, which is fixed to the socket 228 and opens above a fixed hopper 238, passing obliquely through the hopper 10 (see Figs. 6, 7, 8). The first half of the tea or other material is fed directly from the hopper 10 into the bag with its corresponding box 7, situated beneath said hopper. The second half of the charge is received by a pocket 240 fixed to a rotary support 241, which carries four similar pockets and intermittently rotates by quarter revolutions, being actuated by the wheel 29 through the medium of a wheel 242 on a shaft 243, and gear wheels 244, 245. The second half of the charge will thus be conveyed in the pocket 240 to F, simultaneously with the first portion of the charge contained in the bag.

During the displacement of the bag from each filling station, the bag and its contents are subjected to trepidation produced by means of a series of inclined skew teeth 246 fixed on the table 5 (see Figs. 4 and 5). To this end each box 7 is slidably mounted in a bracket 247 fixed to the plate 3, and is provided with a beveled heel piece or projection 248 which rides over the teeth 246 and is pressed against the latter by a spring 249 in such a manner that the box 7 has a rapid vertical reciprocating motion of short amplitude imparted to it. A spring 250 holds the paper bag well against the box in order that it shall participate in the said shaking process. On the bag being conveyed to E, its contents are rammed down by the ram 251, which is vertically reciprocated through the medium of the wheel 28, pinion 252, spur wheel 253 toothed rack 254 on the plunger or ram rod 255 and spring 256 interposed between the rack and the rod.

The device for opening the receptacles 240 is situated at F and the bottom of each receptacle is composed of two inclined shutters 257 hinged at 258 and held normally closed by the action of a spring 259; the said shutters are provided with lugs 260, the pocket or receptacle 240 opening on downward pressure being applied to the said lugs. Such pressure is obtained by means of a lever 261 (see Fig. 22) swinging on a fixed spindle 262, one end of which is connected with another lever 263, which receives from the wheel 28 a rocking motion through the medium of a bevel pinion 264, of a spur pinion 265, and of a toothed segment 266. When the said pocket 240 is opened its contents fall into the funnel 267 which transfers same into the paper bag. A second plunger or ram 270 is located at G to pack the second half of the contents of the bag and is actuated by pinions 264, 265 mounted upon the shaft 271 and a crank 272 connected to a pitman 273 (see Figs. 2 and 8).

*Closing of the bag.*—In its movement between the positions G and J, the bag passes through a pasting device N, comprising a mollet 274 (see Figs. 23 and 24) which rotates within a paste-cup 275 and a swinging arm 276 which carries a movable finger 277 intended to take paste from the mollet and apply the same to the inner edge of the wall of the bag in front. The mollet 274 receives an intermittent rotation from the cam 19 through the medium of a lever 278 connected to a horizontal shaft 279 carrying a toothed segment 280 meshing with a bevel wheel 281 Figs. 2 and 10 which transmits motion to a vertical shaft 282 provided with a toothed segment 283. A link 284 is pivoted at one end to the shank of the segment 283 and at the other end to a lever 285 carrying a pawl 286 engaging a ratchet wheel 287 meshing with bevel wheels 288 and 289. On the other hand, the arm 276 receives from the shaft 21 a rocking motion through the medium of a crank 290 connected to a pitman 291 which in turn is secured to a lever 292 carrying at one end a toothed segment 293 meshing with the gear wheels 294 and 295 which latter is mounted on a shaft 296. The finger 277 is loosely mounted on a spindle carried by the arm 276 and is connected by a spring 298 with a lever 299 fixed on the said spindle which also carries a pinion 300 gearing with another pinion 301 which meshes with a toothed wheel 302 also mounted on the arm 276. The wheel 302 is normally held by a spring 303 in the position shown in Fig. 23, and carries a pin 304 so arranged as to be engaged by a projection 305 of the box 7 when the arm 276 is lowered. On account of this pin being carried forward in the movement of the box 7, the wheel 302 is rotated approximately one quarter of a revolution and causes the spindle 297 to rotate about three-fourths of a revolution, so that the finger 277 moves down and applies itself yieldingly against the inner wall of the bag in motion, depositing thereon the paste with which it was previously coated. When the pin 304 is released the finger 277 is brought back into its initial position by the spring 303 and the arm 276 then rocks about its axis so that the finger 277 is brought against the mollet 274 and takes paste for the pasting of another bag. On arriving at J, the bag together with the box 7 is moved up to the position shown in broken lines in Fig. 25 and is then closed by the action of the shutters 306, 307, 308, 309 the four walls of which move down successively against the packed tea contained in the bag (see Figs. 25 and 26). For this purpose the shutters are mounted on hinges on a fixed bracket 310 and are connected by links 311 with slides 312 movable in inclined slideways 313 which are formed in the said bracket; each of the said slides is provided with a cam roller 314, engaged in one of the slide-ways 315, 316, 317, 318 of a conical cam 319 rotatable on the bracket 310.

The cam 319 is angularly reciprocated by the toothed segment 283 meshing with the toothed segment 320, and the slide-ways 315 to 318 are so shaped as to effect successively the displacement of the slides 312 in their slide-ways in order to produce the alternate lowering and raising of the shutters, which are preferably of triangular or trapezoid contour so combined as to produce the proper closing folds of the bag in a predetermined order. The shutter 306 first moves down to fold the rear side of the bag then the shutters 307 and 308 move down afterward to fold successively the lateral sides of the bag, the shutter 309 being the last to move down to fold the front side of the bag which has been previously coated with paste. The articulation of the latter shutter on the bracket 310 is obtained by means of lateral lugs 321, so arranged that the inner face of the shutter gives clearance and allows of the free passage of the folded bag beneath it when the plate 3 is again put in motion, before the shutters move up again.

The lifting up of the bag before folding takes place has for its purpose to bring the top up to the same level as the hinges of the shutters and is effected by means of a plunger 322 which is reciprocated from the shaft 21 through the instrumentality of a crank 323 (see Fig. 2) and a connecting rod 324. connected at 325 to a sleeve surrounding the plunger rod 326, which latter is adapted to slide the said sleeve. During the greater part of a forward stroke the plunger rod is positively connected to the sleeve 325 by a bolt 329 mounted in a bracket 327 fixed to the said sleeve but, toward the end of the stroke a bent lever 328 mounted on the bracket 327 comes into contact with a stationary buffer $329^x$ and withdraws the bolt 329 from the rod 326 so that the plunger 322 is no longer positively connected with the socket 325 save through the medium of a spiral spring 330. The plunger may therefore give way more or less under the pressure of the bag closing shutters, according as the level of the bag rises more or less above the axis of the hinges of the said shutters.

*Applying the safety strip.*—After the bag is closed at J, it is conveyed by the rotation of the plate 3 to K where the safety strip is applied (see Figs. 2, 9, 29, 30). The strip Z serving for that purpose is printed and perforated at intervals 331 corresponding to the length of strip necessary to surround a bag. The said strip Z unwinds from a spool 332, and is passed around a tension roller 333 to a drum 334 provided with pins 335 on its periphery so arranged as to engage the perforations. The drum 334 receives from the shaft 4 and spur gear 29 an intermittent rotation through the train of wheels 44, 45, 46, 47 bevel wheels 336 and 337 and the spur wheels 338 and 339 in such a manner that the strip Z is carried forward between a small stationary table 340 and a fixed comb 341 between the teeth of which rotate the pasting mollets 342 the latter being supplied with paste from a paste-cup 343 and by the rollers 344, 345, which are rotated by the toothed wheels 346, 347, 348, and 349, the first one of which meshes with the wheel 338. The periphery of the roller 342 has a slot 350 and the development of the said periphery is such that the said slot coincides with the perforations 331; the lines of paste 351 (see Fig. 30) applied to the strip Z, are continuous at those places where the strip is to be severed and the fouling of the cutter 352 by the paste in thus avoided.

The end portion of the strip is supported by two endless belts 356, and a drawer 357 placed between the belts under the position where the box 7 stops with the closed bag contained in the same, in order to contribute to the carrying forward of the strip Z, the said belts being put in motion at the same time as the drum 334, through the medium of the wheels 339, 363, 364 and 365. The cutter is operated from the shaft 21 and has imparted to it a swinging motion around a shaft 353 through the medium of a crank 354 and a connecting rod 355, so as to sever the strip Z when the drum 334 comes to rest.

At the same time that the severance takes place, the drawer 357 is displaced by means of a crank 358 and pitman 359 connected to a bent lever 360 and a link 361, so as to uncover the orifice of a vertical cylinder 362, located between the belts 356. At that moment the closed bag is expelled from the box 7 and introduced with the safety strip into the cylinder 362 by the action of a plunger 366 to which motion is imparted from the shaft 21 by means of a bevel pinion 367, a spur wheel 368 and a toothed rack 570 integral with the plunger rod 366. To close the ends of the strip down on to the bag thus carried forward into the cylinder 362, use is made of two shutters 371 and 372 articulated to the upper part of the latter and actuated by means of the cam 20 on the driving shaft operating a lever 373 mounted on the horizontal shaft 374 and a toothed segment 375 meshing with a gear wheel 376, which latter actuates a cam having a groove 377, said cam rocking two levers 378, having toothed segments 379 which segments gear with the wheels 380 mounted on the shutter shafts. During one period of the rocking movement, one of the levers 378 is actuated so as to move down and to move up the shutter 371 and, consequently, to paste on the bag one end of the strip Z, then the cam 377 actuates the other lever 378, after having brought the first named lever to rest, so as to paste the other end of the strip down to the bag.

In order to oppose a certain resistance to the pressure of the folding shutters, the bag is yieldingly held tight by means of flat springs 381, adjustably arranged in the walls of the cylinder 362. When the shutter 372 is moved up, the strip Z is again fed forward, and a fresh bag is brought to K, where it is moved down in its turn into the cylinder with its severed strip and forces downward the previous bag and pushes same out of the machine through the inclined orifice 382 of the cylinder 362. This pressure of the bags on each other tends to strengthen the pasting of the strip on their ends.

The above described machine allows of obtaining in a continuous manner a rapid and entirely automatic making of the bags, a division by weight of the material to be made up into parcels, the filling and closing of the bags, and the application of the safety strip.

The use of the lining web X is not indispensable for the making of the bag, and it may be disposed of without departing from the spirit of the invention, the operation being the same as to the use of previously printed paper for the making of the bag and the safety strip in which case, the feed mechanisms for the webs W and Z may be simplified accordingly. I may also modify the mechanism for making the bags to vary the shape and mode of folding the latter and the mechanism for dividing and weighing the material to be made up into parcels according to its nature and the physical state of the same; also the several devices for filling, ramming and closing the bags, and so forth, as well as the parts actuating the same, provided the general arrangement of the machine remains the same. This arrangement affords every facility as to access to and supervision of all the parts of the machine, which is rendered very compact, the continuous supply of the material to be treated being made very easy, the control of the several mechanisms only requiring a small number of shafts and cams, and the regular and efficient working of all the parts is made secure.

It is possible in some cases, to reduce the number of operations, and particularly to effect the filling in a single operation, and the ramming in a single operation also, and even to do away with ramming altogether. The number of the divisions of the plate 3 (eight as herein shown) may therefore be varied and the number of the arms of the bracket 71 carrying the molds may be increased or diminished according to the time required for drying the paste.

The bags may be made of other material than paper, such for instance, as pasteboard, tin foil or the like.

The use of material in continuous webs is particularly advantageous for the making of the bags and safety strips and when the material is printed beforehand, such use is rendered possible on account of the perforations made in the continuous webs at the same time as the printing.

Claims:—

1. A parceling machine comprising a main frame, a rotary plate turning step by step, boxes on the said plate to receive bags, a device on the main frame adapted to introduce into each bag a portion of a weighed quantity of material a device on the main frame to ram the said portion down means for introducing the remainder of the charge into the bag, means for ramming the material in the bag after each partial filling, and means for closing the bag.

2. In a parceling machine, the combination of the feed roller for feeding step by step a continuous web, a swinging bracket, paste-cups on the said bracket, mollets in the said cups to paste the edges of the web, means for causing the mollets to turn at the same time as the rollers, and means for causing the said bracket to swing during a part of the rotation of the rollers.

3. In a parceling machine, the combination of a star shaped bracket, bag mold on the said bracket, means for causing the said bracket to turn step by step, clips on each mold having flat springs to hold the bag tight on the opposite faces of the mold, means for opening and for closing the clips, and means for holding the clips in their opened and closed positions.

4. In a parceling machine, the combination of a main frame, a rotary plate, a bracket on the said plate having a slide-way, a box in the said slide-way, a beveled extension on the said box, inclined or skew teeth on the main frame, and a spring pressing the said extension onto the teeth.

5. In a parceling machine, the combination of a main frame, a bracket on the main frame, a paste-cup on the bracket, a mollet rotating on the cup, an arm pivoted to the bracket, a finger pivoted to the arm, a lever pivoted to the arm, a rotary plate, a box on the said plate to receive a bag, a projection on the box adapted to engage the said lever, means for causing the said arm to swing, and means for transmitting and amplifying the rotation of the said lever to the said finger.

6. In a parceling machine, the combination of a bracket, four shutters articulated to the said bracket, slide-ways in the bracket, slides, links connecting the slides with the shutters, a conical cam having grooves and the grooves of which engage the slides, and means for imparting a rocking movement to the said conical cam.

7. In a parceling machine, the combination of a main frame, a rotary plate, a box on the said plate to receive a bag, a bracket on the main frame, shutters articulated to the said bracket, a plunger constructed to lift the bag up in the box, and means for actuating the said plunger and the shutters.

8. In a parceling machine, the combination of a main frame, a rotary plate, a box on the said plate to receive a bag, a bracket on the main frame, shutters articulated to the said bracket, a plunger constructed to lift the bag up in the box, an independent plunger rod, a spring between the plunger and the rod, a lock bolt to lock the plunger on the rod, means for unlocking the plunger at the end of the working stroke, and means for actuating the plunger rod and the said shutters.

9. In a parceling machine, a mechanism for feeding, pasting and severing a perforated continuous web comprising a feed drum having spurs, a paste-cup, pasting mollets adapted to apply several lines of paste to the said web, said mollets having slots therein, a cutter, means for actuating together the sheave and the mollets in such a manner that at each step by step feed the part of the web corresponding to the said slots shall be fed under the cutter, and means for actuating the cutter.

10. In a parceling machine, the combination of a main frame, a rotary plate, a box on the said plate to receive a bag, a cylinder or conduit on the main frame, a plunger to ram the bag down the conduit, means for feeding a pasted or gummed strip across the said conduit, and shutters articulated to the top of the conduit to move downward and inward the ends of the strip.

In testimony, that I claim the foregoing as my invention, I have signed my name in presence of two subscribing witnesses.

JEAN BARDET.

Witnesses:
 HANSON C. COXE.
 MAURICE ROUX.